United States Patent (10) Patent No.: US 9,563,474 B2
Govindarajeswaran et al. (45) Date of Patent: Feb. 7, 2017

(54) METHODS FOR MANAGING THREADS WITHIN AN APPLICATION AND DEVICES THEREOF

(71) Applicant: Wipro Limited, Bangalore (IN)

(72) Inventors: Maheshwaran Govindarajeswaran, Chennai (IN); Arun Jeyaprasad, Chennai (IN)

(73) Assignee: Wipro Limited, Bangalore (IN)

( * ) Notice: Subject to any disclaimer, the term of this patent is extended or adjusted under 35 U.S.C. 154(b) by 796 days.

(21) Appl. No.: 13/959,471

(22) Filed: Aug. 5, 2013

(65) Prior Publication Data

US 2014/0373020 A1 Dec. 18, 2014

(30) Foreign Application Priority Data

Jun. 13, 2013 (IN) .......................... 2573/CHE/2013

(51) Int. Cl.
*G06F 9/46* (2006.01)
*G06F 9/50* (2006.01)
*G06F 9/48* (2006.01)

(52) U.S. Cl.
CPC ............ *G06F 9/5005* (2013.01); *G06F 9/466* (2013.01); *G06F 9/4881* (2013.01); *G06F 9/50* (2013.01); *G06F 9/505* (2013.01); *G06F 9/5027* (2013.01); *G06F 9/5072* (2013.01); *G06F 9/5083* (2013.01); *G06F 2209/5018* (2013.01)

(58) Field of Classification Search
None
See application file for complete search history.

(56) References Cited

U.S. PATENT DOCUMENTS

| 6,584,487 | B1 | 6/2003 | Saboff |
| 8,205,202 | B1 | 6/2012 | Leonard |
| 8,209,702 | B1* | 6/2012 | Roytman ............. G06F 9/5027 718/106 |
| 8,296,454 | B2 | 10/2012 | Youn et al. |
| 8,402,470 | B2 | 3/2013 | Chiang et al. |
| 2006/0179281 | A1 | 8/2006 | Jensen et al. |
| 2009/0019439 | A1* | 1/2009 | Kwon .................. G06F 9/5027 718/100 |

(Continued)

FOREIGN PATENT DOCUMENTS

EP 1536334 A2 8/2004

*Primary Examiner* — Lewis A Bullock, Jr.
*Assistant Examiner* — Mark Gooray
(74) *Attorney, Agent, or Firm* — LeClairRyan, a Professional Corporation

(57) ABSTRACT

This technology relates to assigning a task to a current task queue based on one or more matching category when the new task is received within an application for execution. Availability of one or more existing idle threads within one or more thread groups required for the execution of the received task determined based on one or more utilization parameters, where each of the thread groups is associated with one or more task queues and where the current task queue is one of the task queues. One or more new threads are created to allocate for execution of the task when the existing idle threads are determined to be unavailable in the thread groups within the application. Next, the created new threads are allocated to the task when the existing idle threads are determined to be unavailable. The task is executed using the allocated new threads.

12 Claims, 4 Drawing Sheets

(56) References Cited

U.S. PATENT DOCUMENTS

2010/0153962 A1* 6/2010 Tatu ............... G06F 9/5027
718/105
2011/0231853 A1* 9/2011 Murray ............ H04L 12/24
718/103

* cited by examiner

METHODS FOR MANAGING THREADS WITHIN AN APPLICATION AND DEVICES THEREOF

This application claims the benefit of Indian Patent Application Filing 2573/CHE/2013, filed Jun. 13, 2013, entitled "METHODS FOR MANAGING THREADS WITHIN AN APPLICATION AND DEVICES THEREOF" which is hereby incorporated by reference in its entirety.

FIELD

This technology generally relates to operating system management, more particularly, to methods for managing threads within an application and devices thereof.

BACKGROUND

A thread is a light-weight process. The implementation of threads and processes differs from one operating system to another, but in most cases, a thread is contained inside a process. Multiple threads can exist within the same process and share resources, such as memory, while different processes do not share these resources.

Multi-threading is a widespread programming and execution model that allows multiple threads to exist within the context of a single process. These threads share the resources allocated to the process, but are able to execute independently. An interesting application of multithreading is when it is applied to a single process to enable parallel execution on a multiprocessing system. Multithreading allows the process to be executed faster on computer systems that have multiple CPUs, CPUs with multiple cores, or across a cluster of machines—because the threads of the program naturally lend themselves to truly concurrent execution. Accordingly, managing of threads is extremely important.

Unfortunately, existing thread management technologies leads to situation where threads of one group would be idle, while threads in other groups are created to execute a number of tasks without using the idle threads thereby not effectively managing the threads. This situation is due to unsupervised creation of threads by individual applications without having any visibility on idle threads being available.

SUMMARY

A method for managing threads within an application includes a thread management computing device assigning a task to a current task queue based on one or more matching category when the new task is received within an application for execution. Availability of one or more existing idle threads within one or more thread groups required for the execution of the received task within the application is determined by the thread management computing device based on one or more utilization parameters. Each of the one or more thread groups is associated with one or more task queues and the current task queue is one of the one or more task queues. One or more new threads are created by the thread management computing device for allocation to execute the task when the existing one or more idle threads are determined to be unavailable in the one or more thread groups within the application. One or more of the new created threads are allocated by the thread management computing device to the task when the existing one or more idle threads are determined to be unavailable. The task is executed by the thread management computing device using the allocated one or more new threads.

Then the non-transitory computer readable medium having stored thereon instructions for managing threads within an application comprising machine executable code which when executed by at least one processor, causes the processor to perform steps including assigning a task to a current task queue based on one or more matching category when the new task is received within an application for execution. Availability of one or more existing idle threads within one or more thread groups required for the execution of the received task within the application is determined based on one or more utilization parameters. Each of the one or more thread groups is associated with one or more task queues and the current task queue is one of the one or more task queues. One or more new threads are created for allocation to execute the task when the existing one or more idle threads are determined to be unavailable in the one or more thread groups within the application. One or more of the new created threads are allocated to the task when the existing one or more idle threads are determined to be unavailable. The task is executed using the allocated one or more new threads.

A thread management computing device comprising one or more processors, a memory, wherein the memory coupled to the one or more processors which are configured to execute programmed instructions stored in the memory including assigning a task to a current task queue based on one or more matching category when the new task is received within an application for execution. Availability of one or more existing idle threads within one or more thread groups required for the execution of the received task within the application is determined based on one or more utilization parameters. Each of the one or more thread groups is associated with one or more task queues and the current task queue is one of the one or more task queues. One or more new threads are created for allocation to execute the task when the existing one or more idle threads are determined to be unavailable in the one or more thread groups within the application. One or more of the new created threads are allocated to the task when the existing one or more idle threads are determined to be unavailable. The task is executed using the allocated one or more new threads.

This technology provides a number of advantages including providing more effective methods, non-transitory computer readable medium and devices for managing threads. For example, this technology may iterate different thread groups inside an application based on utilization parameters for allocation or poaching of threads from one thread group to another thread group for task execution. Additionally, this technology minimizes the need to the dynamic extension or creation of new threads only when no idle threads are determined to be available in other thread groups. Accordingly, with this technology thread allocation and expansion happens in a controlled and efficient manner as opposed to simply creating new threads when idle threads are determined to be unavailable in only one thread group. Further, if idle threads are identified in different thread groups, the technology provides advantages of adapting the characteristics those idle threads in different thread groups to suit the task which those idle threads have to execute.

The technology disclosed here also provides advantages of a peeping mechanism where threads in a particular group are given priority to the tasks present within the queue associated with the thread group. For example, if a starving thread group A requires threads, the technology disclosed iterates through other thread groups B and C for any available threads. If idle threads are present in thread group B, those idle threads are allocated to the starving thread group A for the execution of task present in task queue associated with starving thread group A. However, upon execution of the task, if there is a pending task in the queue associated with thread group B, the idle threads which had been allocated from thread group B to thread group A, will be reallocated back to thread group B for execution of the pending task. This exemplary method would prevent unnecessary creation of new threads within the thread group B.

DETAILED DESCRIPTION

Figure 1:
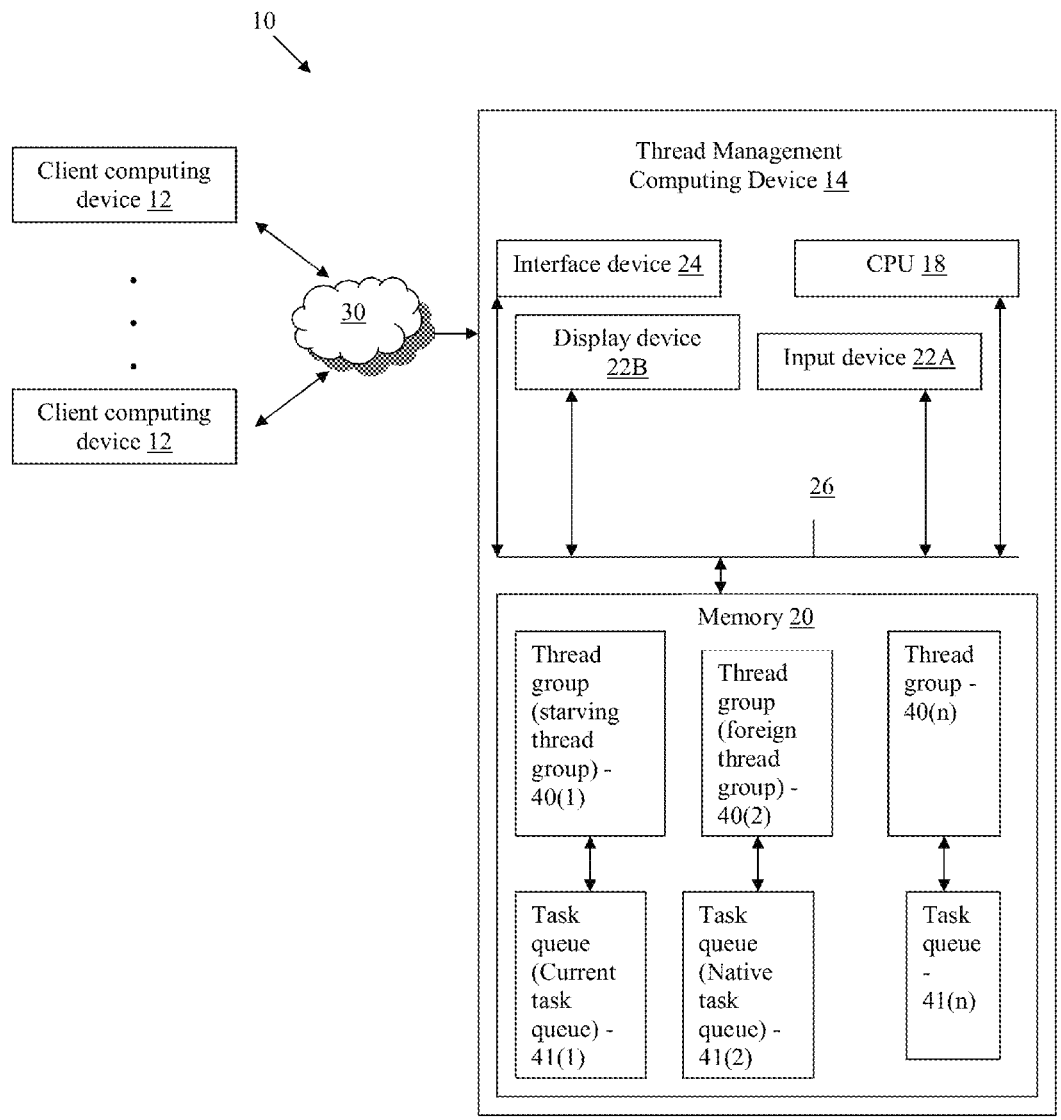
FIG. 1 is a block diagram of an exemplary thread management computing device for managing threads within an application.

An exemplary environment 10 including a client computing devices 12, and a thread management computing device 14 for managing threads within an application is illustrated in FIG. 1. The exemplary environment 10 includes plurality of client computing devices 12, the thread management computing device 14, and which are coupled together by a communication network 30, although the environment can include other types and numbers of devices, components, elements, and communication networks 30 in other topologies and deployments. While not shown, the exemplary environment 10 may include additional components, such as database etc, which are well known to those of ordinary skill in the art and thus will not be described here. This technology provides a number of advantages including providing more effective methods, non-transitory computer readable medium and devices for managing threads.

The thread management computing device 14 assists with managing threads within an application as illustrated and described with the examples herein, although thread management computing device 14 may perform other types and numbers of functions. The thread management computing device 14 includes at least one CPU/processor 18, memory 20, input device 22A and display device 22B, and interface device 24, one or more thread groups 40(1)-40(n) and their associated task queues 41(1)-41(n) which are all coupled together by bus 26, although thread management computing device 14 may comprise other types and numbers of elements in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2A:
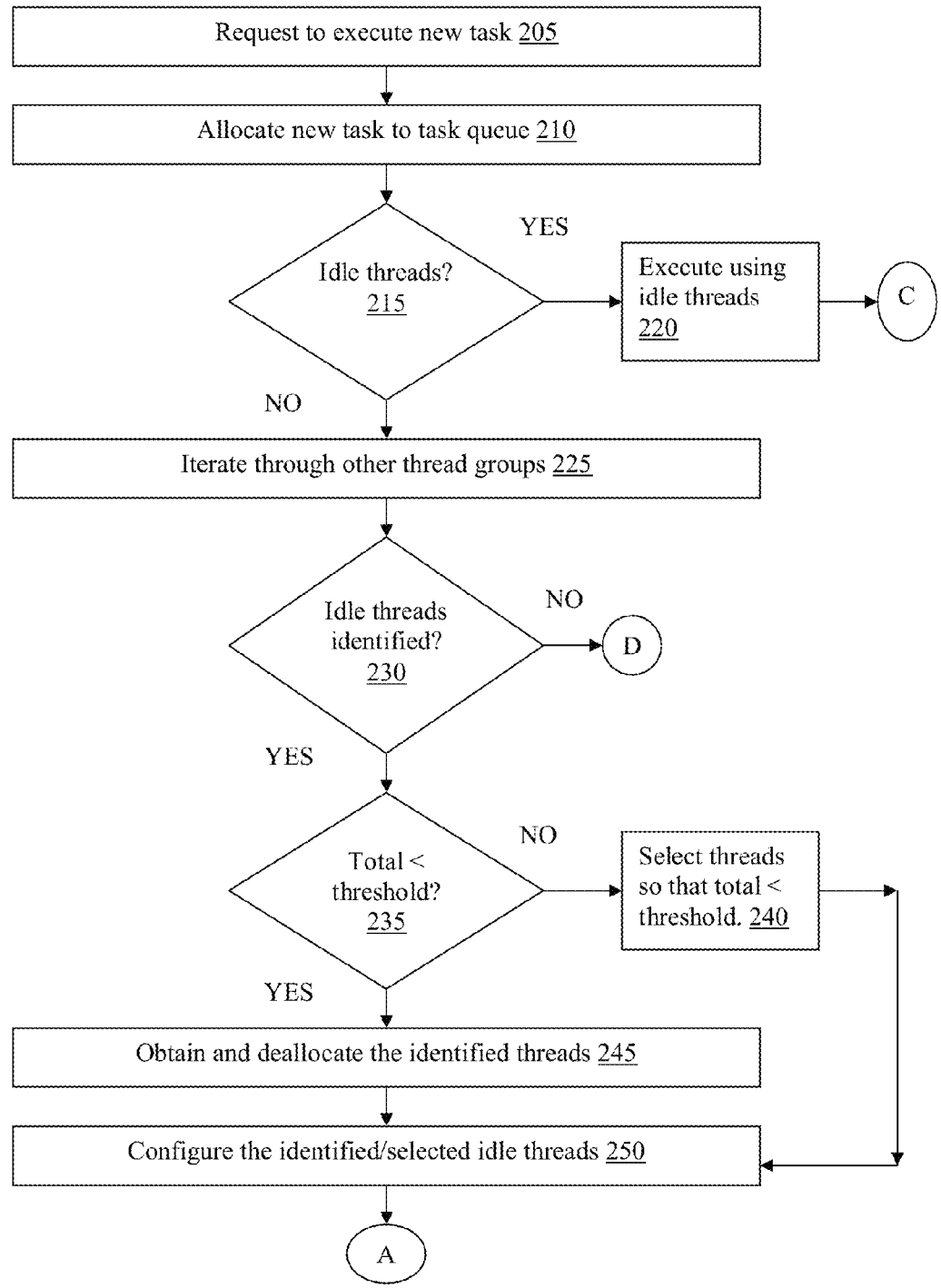
FIGS. 2A-2C are flowcharts of an exemplary method for managing threads within an application.
Figure 2B:
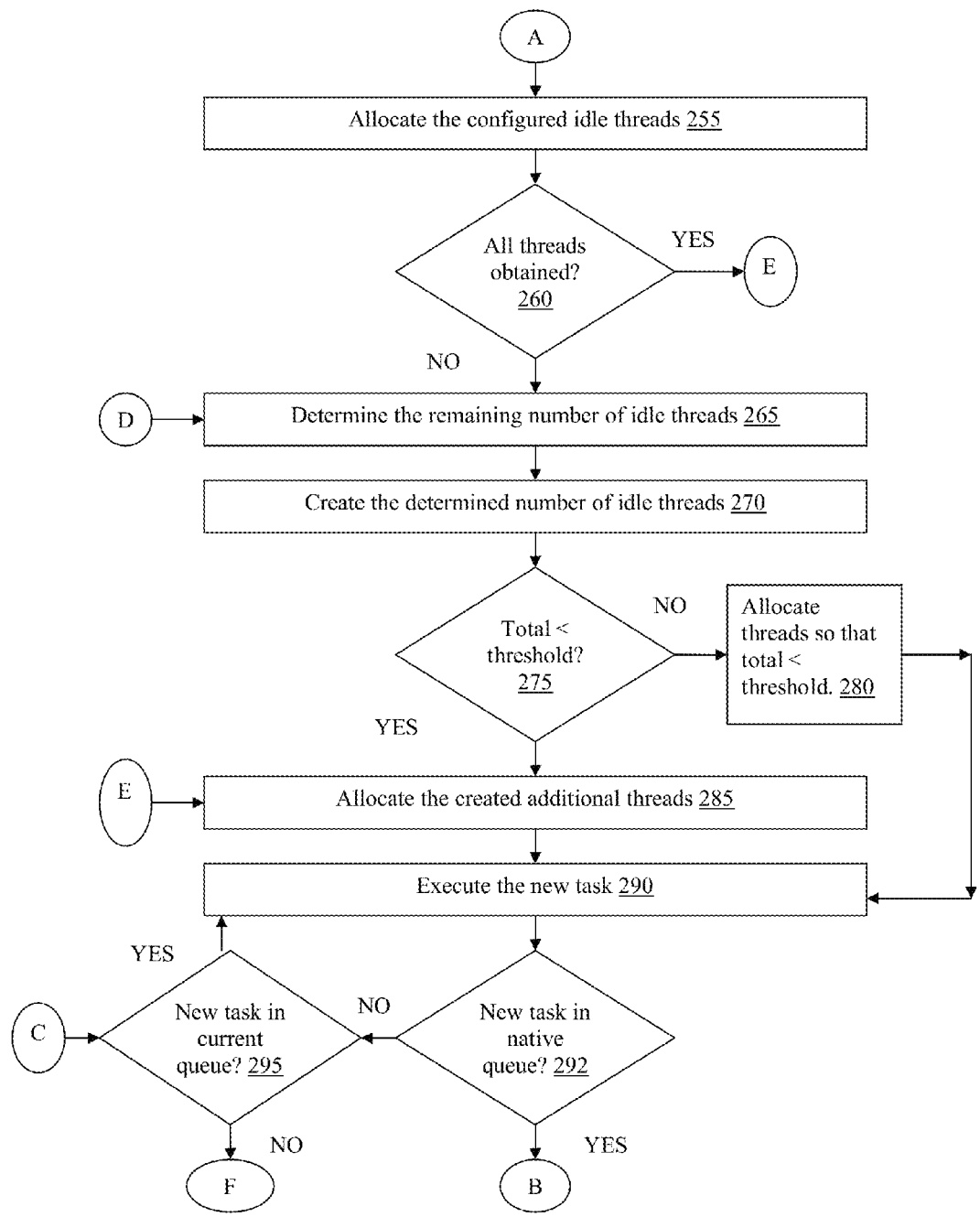
Figure 2C:
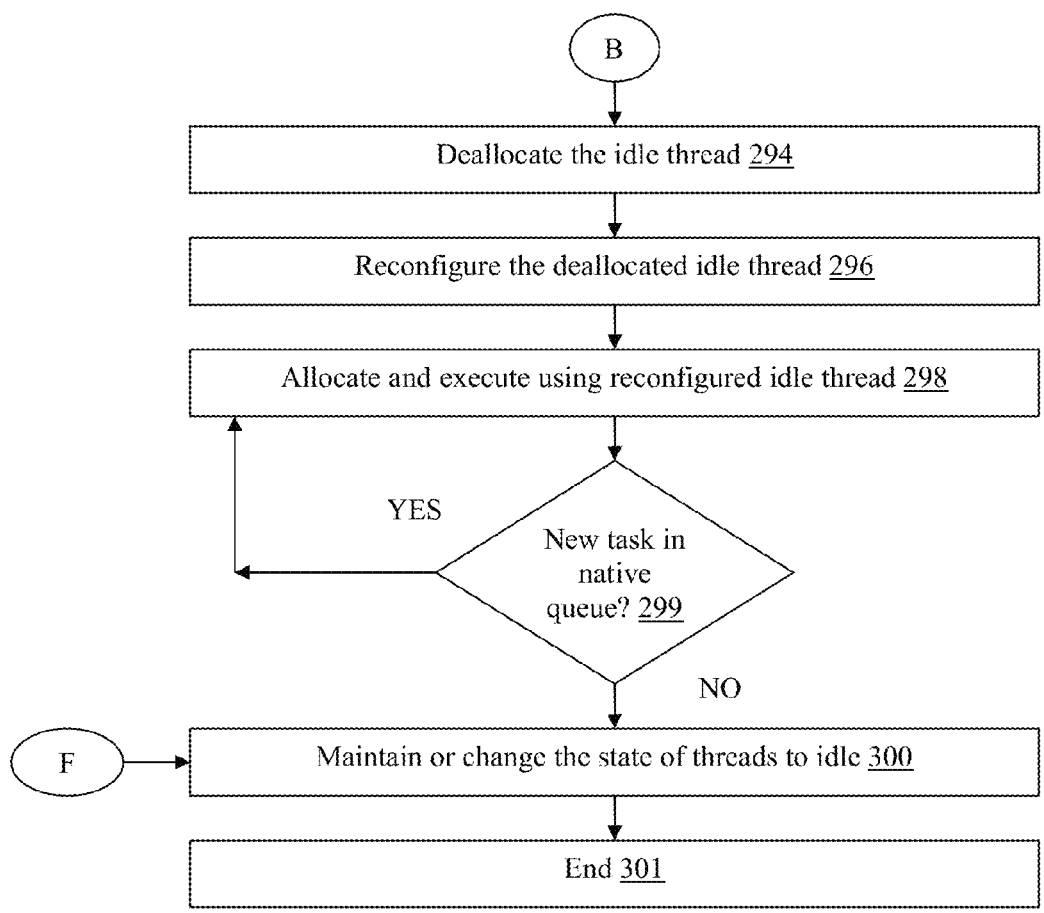

Memory 20 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIG. 2A-2C is representative of example steps or actions of this technology that may be embodied or expressed as one or more non-transitory computer or machine readable instructions stored in memory 20 that may be executed by the processor(s) 18. As illustrated in FIG. 1, memory 20 further includes thread groups 40(1)-40(n) and their associated task queues 41(1)-41(n). Thread groups 40(1)-40(n) includes one or more threads required for executing of tasks within the associated task queues 41(1)-41(n). In this example, the thread groups include one or more active threads and one or more idle threads. Active threads in this example relates to threads which are being used to execute tasks in the task queues 41(1)-41(n) and idle threads relates to threads which are present in the thread groups and not currently utilized for the execution of the tasks in the task queues 41(1)-41(n).

Input device 22A enables a user, such as a programmer or a developer, to interact with the thread management computing device 14, such as to input and/or view data and/or to configure, program and/or operate it by way of example only. By way of example only, input device 22A may include one or more of a touch screen, keyboard and/or a computer mouse.

The display device 22B enables a user, such as an administrator, to interact with the thread management computing device 14, such as to input and/or view data and/or to configure, program and/or operate it by way of example only. By way of example only, the display device 22B may include one or more of a CRT, LED monitor, or LCD monitor, although other types and numbers of display devices could be used.

The interface device 24 in the thread management computing device 14 is used to operatively couple and communicate between the thread management computing device 14 and client computing devices 12, although other types and numbers of systems, devices, components, elements and/or networks with other types and numbers of connections and configurations can be used. By way of example only, the thread management computing device 14 can interact with other devices via a communication network 30 such as Local Area Network (LAN) and Wide Area Network (WAN) and can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other types of buses and/or other links may be used, such as PCI.

Each of the client computing devices 12 includes a central processing unit (CPU) or processor, a memory, an interface device, input device and display device, which are coupled together by a bus or other link, although each could have other types and numbers of elements and/or other types and numbers of network devices could be used in this environment. The client computing device 12, in this example, may run interface applications that may provide an interface to access applications executing in the thread management computing device 14.

It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as then the non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for managing threads within an application will now be described with reference to FIGS. 1-2. This example begins at step 205 where the thread management computing device 14 receives a request to execute a new task within an application executing in the memory 20 from the client computing device 12, although the thread management computing device 14 can receive other types and amounts of requests from the client computing device 12. In this example, the new task requires about ten threads for execution, although the number of threads required by the task may vary depending on the type of task or the type of application executing the task. The number of threads required for execution of the application is the utilization parameter of the new task.

In step 210, the thread management computing device 14 allocates the new task in one of the task queues 41(1)-41(n) based on one or more matching category of the received new task, although the thread management computing device 14 can allocate the new task into other task queues 41(1)-41(n) based on other parameters. By way of example only, the thread management computing device 14 assigns the received new task into a current task queue 41(1) as the received new task matches with the type of tasks existing in the current task queue 41(1), where the current task queue 41(1) is one of the task queues 41(1)-41(n).

In step 215, the thread management computing device 14 determines if there ten idle threads (which is the utilization parameter) in the thread group associated with the current task queue 41(1), which in this example is thread group 40(1), which for purpose of further illustration will be called starved thread group. Additionally, in this example, idle threads relates to threads which are not being used for execution of tasks within an application. If the thread management computing device 14 determines that the starved thread group (thread group 40(1)) has ten idle threads for executing the new task, then the Yes branch is taken to step 220 where the new task is executed using the ten threads available in the starved thread group (thread group 40(1)) and the exemplary process proceeds to step 295. However, if the thread management computing device 14 determines that ten idle threads are not present in the starved thread group (thread group 40(1)), then the No branch is taken to step 225. In this example, the thread management computing device 14 determines that starved thread group (thread group 40(1)) includes six idle threads and requires four more idle threads and accordingly, the Yes branch is taken to step 225.

In step 225, the thread management computing device 14 iterates through other thread groups 40(2)-40(n) to identify the remaining number of idle threads required for the execution of the new task, which in this example is four idle threads (as six idle threads were present in the starved thread group and the new task requires a total number of ten idle threads for execution). In this example, the thread management computing device 14 identifies two threads in the other thread group 40(2), which for the purpose of further illustration will be called foreign thread group. The task queue associated with the foreign thread group (thread group 40(2)) is a native task queue 41(2), which is one of the one or more task queues 41(1)-41(n).

In step 230, the thread management computing device 14 determines if any of the remaining number of idle threads was identified in other thread groups 40(2)-40(n). If the thread management computing device 14 determines that any of the remaining number of idle threads was not found, then the No branch is taken to step 265. However, if the thread management computing device 14 determines that the remaining number of idle threads was found in the other thread groups 40(2)-40(n), then the Yes branch is taken to step 235. In this example, as the thread management computing device 14 identifies two idle threads in the foreign thread group (thread group 40(2)) and then the Yes branch is taken to step 235.

In step 235, the thread management computing device 14 determines if the total number of threads identified is less than a maximum threshold of threads which can be allocated to the starving thread group. In this example, the total number of threads is a summation of the number of threads identified in the starving thread group and the threads identified in the foreign thread group. Additionally, for purpose of illustration only, the maximum threshold of the starving thread group is twenty. Accordingly, if the thread management computing device 14 determines that the total number of threads is not less than the maximum threshold, then the No branch is taken to step 240.

In step 240, the thread management computing device 14 retains all the idle threads identified in the starving thread group (thread group 40(1)) and selects a remaining idle threads from the foreign thread group (thread group 40(2)) so that the total number of threads identified or selected would be less than the maximum threshold and the exemplary flow proceeds to step 250.

However, in step 235, if the thread management computing device 14 determines that the total number of threads is less than the maximum threshold, then the Yes branch is taken to step 245. In this example, since the total number of threads identified, that is eight threads (six from the starving thread group and two from the foreign thread group) is less than the maximum threshold of twenty threads, then the Yes branch is taken to step 245 avoiding the step 240.

In step 245, the thread management computing device 14 obtains and deallocates the identified two idle threads in the foreign thread group (thread group 40(2)), although the thread management computing device 14 can perform other operations on the identified idle threads prior to deallocating.

In step 250, the thread management computing device 14 configures the identified or selected two idle threads from the foreign thread group (thread group 40(2)) based on the characteristics of the current task queue 41(1) or the type of the new task to be executed in the current task queue 41(1), although the thread management computing device 14 can configure the identified idle threads based on other parameters.

In step 255, the thread management computing device 14 allocates the configured two idle threads to the starving thread group (thread group 40(1)).

Next, in step 260, the thread management computing device 14 determines if the total number of threads required for the execution of the new task, which in this example is ten threads, has been identified or obtained. If the thread management computing device 14 determines that the total number of threads required by the new task has not been identified or obtained, then the No branch is taken to step 265 to further determine the remaining number of idle required for the execution of the new task. However, if the thread management computing device 14 determines that the number of threads required for the execution of the new task has been identified or obtained, then the Yes branch is taken to step 285. In this example, since the total number of threads required for the execution of new task has not been identified or obtained, then the No branch is taken to step 265.

In step 265, the thread management computing device 14 determines the remaining number of idle threads required for the execution of the new task, which in this example is two threads (as six idle threads were identified in starving thread group and two idle threads were identified in foreign thread groups and the total number of threads required for execution of new task is ten).

In step 270, the thread management computing device 14 creates the determined remaining number of idle threads in the starving thread group (thread group 40(1)) with characteristics required for the execution of the new task allocated current task queue 41(1). In this example, the thread management computing device 14 creates two new threads.

In step 275, the thread management computing device 14 determines if the total number of threads, which in this example is, number of threads identified in the starving thread group (thread group 40(1)), number of threads identified in the foreign thread group (thread group 40(2)) and the created idle threads, put together is less than the maximum threshold. If the thread management computing device 14 determines that the total number of threads is not less than the maximum threshold, then the No branch is taken to step 280.

In step 280, the thread management computing device 14 allocates the created additional threads in the starving thread group (thread group 40(1)) for the execution of the new task in such a way that the total number of threads does not exceed the maximum threshold and the exemplary flow proceeds to step 290.

Optionally, if the thread management computing device 14 determines that even allocating one created additional thread to the new task for execution would result in total number of threads exceeding the maximum threshold, then the thread management computing device 14 may not allocate any created additional new threads and the thread management computing device 14 may wait until other idle threads are determined to be available in the starving thread group (thread group 40(1)) and then may allocate the idle threads for execution of the new task.

If back in step 275, the thread management computing device 14 determines that the total number of threads is less than the maximum threshold, then the Yes branch is taken to step 285 where the created additional threads are allocated for the execution of the new task. In this example, since the total number of threads, which is ten threads (six threads from starving thread group, two threads from foreign thread group and two created additional threads) is less than the maximum threshold twenty, then the Yes branch is taken to step 285.

Next, in step 290, the thread management computing device 14 executes the new task using the identified threads and/or created threads. In this example, the thread management computing device 14 executes the new task using the six idle threads obtained from the starving thread group (40(1)), two idle threads obtained from foreign thread group (40(2)) and the two created additional threads.

Next, in step 292, the thread management computing device 14 determines if there is any recently added task present in the native task queue 41(2) waiting for execution. If the thread management computing device 14 determines that there is no recently added task for waiting for execution, then the No branch is taken to step 295 where the thread management computing device 14 determines if there are any recently added tasks to the current task queue 41(1). If the thread management computing device 14 determines that the current task queue 41(1) includes recently added tasks, then the Yes branch is taken to step 215. If the thread management computing device 14 determines that the current task queue 41(1) does not include recently added tasks, then the No branch is taken to step 300. In this example, there is no recently added task present in the native task queue 41(2), then the No branch is taken to step 300.

However, if in step 292, the thread management computing device 14 determines that there is any recently added task present in the native task queue 41(2) waiting for execution, then the Yes branch is taken to step 294. In this example, the thread management computing device 14 determines that there is a recently added task present in the native task queue 41(2).

In step 294, the thread management computing device 14 deallocates the idle thread which was initially obtained from the foreign thread group 40(2) in step 245. In this example, the thread management computing device 14 deallocates the two idle threads which were obtained in step 245. Alternatively, the thread management computing device 14 may repeat steps 225-290 if the number of threads required for the execution of the recently added task present in the native task queue 41(2).

In step 296, the thread management computing device 14 reconfigures the deallocated idle threads based on the characteristics of the native task queue 41(2) or the type of task which has been recently added in the native task queue 41(2), although the thread management computing device 14 can reconfigure the deallocated idle threads using other parameters. In this example, the thread management computing device 14 reconfigures the deallocated two idle threads based on the type of recently added task.

In step 298, the thread management computing device 14 allocates the reconfigured idle threads to the foreign thread group (thread group 40(2)), so that the recently added task in the native task queue 41(2) can use these reconfigured threads for execution. In this example, the thread management computing device 14 allocates the reconfigured two idle threads to the foreign thread group (thread group 40(2)) for execution of the recently added task. Additionally, the thread management computing device 14 executes the recently added task in the native task queue 41(2) using the allocated reconfigured idle threads.

Next, in step 299, the thread management computing device 14 determines if there are any other recently added tasks in the native task queue 41(2). If the thread management computing device 14 determines that there are other recently added tasks in the native task queue 41(2) waiting for execution, then the Yes branch is taken to step 298. However, if the thread management computing device 14 determines that there are no other recently added tasks in the native task queue 41(2), then the Yes branch is taken to step 300.

In step 300, the thread management computing device upon execution of all tasks present in the one or more task queues 40(1)-41(n), changes the state of threads which have been created or obtained from one or more thread groups 41(1)-41(n) to an idle state. Alternatively, the thread management computing device 14 may also delete the threads which have been created for thread groups 41(1)-41(n), whose total number of threads are close to the maximum threshold and the exemplary process ends in step 301.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing threads within an application, the method comprising:
   assigning, by a thread management computing device, a task to a current task queue based on one or more matching category when the new task is received within an application for execution;
   determining, by the thread management computing device, availability of one or more existing idle threads within one or more thread groups required for the execution of the received task within the application based on one or more utilization parameters, wherein the one or more utilization parameters includes a number of threads required for execution of the task, wherein each of the one or more thread groups is associated with one or more task queues and wherein the current task queue is one of the one or more task queues;
   determining, by the thread management computing device, when the number of one or more existing idle threads is less than a threshold number of idle threads required for execution and the determining further comprising obtaining the one or more existing idle threads from the one or more thread groups of a native task queue when the one or more existing idle threads is determined to be available in the one or more thread groups and when the number of existing one or more existing idle threads is determined to be less than the threshold number of idle threads required for execution, wherein the native task queue is one of the one or more task queues;
   configuring, by the thread management computing device, one or more characteristics of the obtained one or more existing idle threads from the native task queue based on the current task queue;
   allocating, by the thread management computing device, the configured one or more existing idle threads and the one or more existing idle threads for the execution of the received task within the current task queue;
   executing, by the thread management computing device, the task using the allocated one or more existing idle threads and the allocated configured one or more existing idle threads;
   determining, by the thread management computing device, for a presence of a new task in the native task queue after execution of the task within the current task queue;
   automatically deallocating, by the thread management computing device, the configured one or more existing idle threads from the current task queue when the new task in the native task queue is determined to be present;
   automatically reconfiguring, by the thread management computing device, the one or more characteristics of the deallocated one or more existing idle threads based on the native task queue; and
   automatically reallocating, by the thread management computing device, the reconfigured one or more existing idle threads for the execution of the new task in the native task queue.

2. The method as set forth in claim 1 wherein the determining further comprises maintaining, by the thread management computing device, the one or more existing idle threads in an idle state when the new task is not determined to be present in the native task queue.

3. The method as set forth in claim 1, wherein the determining further comprises:
   creating, by the thread management computing device, one or more new threads to allocate for execution of the task when the existing one or more idle threads are determined to be unavailable in the one or more thread groups within the application ;
   allocating, by the thread management computing device, the one or more of the new threads to the task when the existing one or more idle threads are determined to be unavailable; and
   executing, by the thread management computing device, the task using the allocated one or more of the new threads.

4. The method as set forth in claim 3, wherein the creating further comprises creating, by the thread management computing device, the one or more new threads wherein a number of the one or more new threads is less than a maximum threshold of new threads in the current task queue.

5. A non-transitory computer readable medium having stored thereon instructions for managing threads within an application comprising machine executable code which when executed by at least one processor, causes the processor to perform steps comprising:
   assigning a task to a current task queue based on one or more matching category when the new task is received within an application for execution;
   determining availability of one or more existing idle threads within one or more thread groups required for the execution of the received task within the application based on one or more utilization parameters, wherein the one or more utilization parameters includes a number of threads required for execution of the task, wherein each of the one or more thread groups is associated with one or more task queues and wherein the current task queue is one of the one or more task queues;
   determining when the number of one or more existing idle threads is less than a threshold number of idle threads required for execution and the determining further comprising obtaining the one or more existing idle threads from the one or more thread groups of a native task queue when the one or more existing idle threads is determined to be available in the one or more thread groups and when the number of existing one or more existing idle threads is determined to be less than the threshold number of idle threads required for execution, wherein the native task queue is one of the one or more task queues;

configuring one or more characteristics of the obtained one or more existing idle threads from the native task queue based on the current task queue;

allocating the configured one or more existing idle threads and the one or more existing idle threads for the execution of the received task within the current task queue;

executing the task using the allocated one or more existing idle threads and the allocated configured one or more existing idle threads;

determining for a presence of a new task in the native task queue after execution of the task within the current task queue;

automatically deallocating the configured one or more existing idle threads from the current task queue when the new task in the native task queue is determined to be present;

automatically reconfiguring the one or more characteristics of the deallocated one or more existing idle threads based on the native task queue; and automatically reallocating the reconfigured one or more existing idle threads for the execution of the new task in the native task queue.

6. The medium as set forth in claim 5 wherein the determining further comprises maintaining, the one or more existing idle threads in an idle state when the new task is not determined to be present in the native task queue.

7. The medium as set forth in claim 5, wherein the determining further comprises:

creating one or more new threads to allocate for execution of the task when the existing one or more idle threads are determined to be unavailable in the one or more thread groups within the application ;

allocating the one or more of the new threads to the task when the existing one or more idle threads are determined to be unavailable; and executing the task using the allocated one or more of the new threads.

8. The medium as set forth in claim 7, wherein the creating further comprises creating the one or more new threads wherein a number of the one or more new threads is less than a maximum threshold of new threads in the current task queue.

9. A thread management computing device comprising:

one or more processors;

a memory, wherein the memory coupled to the one or more processors which are configured to execute programmed instructions stored in the memory comprising:

assigning a task to a current task queue based on one or more matching category when the new task is received within an application for execution;

determining availability of one or more existing idle threads within one or more thread groups required for the execution of the received task within the application based on one or more utilization parameters, wherein the one or more utilization parameters includes a number of threads required for execution of the task, wherein each of the one or more thread groups is associated with one or more task queues and wherein the current task queue is one of the one or more task queues;

determining when the number of one or more existing idle threads is less than a threshold number of idle threads required for execution and the determining further comprising obtaining the one or more existing idle threads from the one or more thread groups of a native task queue when the one or more existing idle threads is determined to be available in the one or more thread groups and when the number of existing one or more existing idle threads is determined to be less than the threshold number of idle threads required for execution, wherein the native task queue is one of the one or more task queues;

configuring one or more characteristics of the obtained one or more existing idle threads from the native task queue based on the current task queue;

allocating the configured one or more existing idle threads and the one or more existing idle threads for the execution of the received task within the current task queue;

executing the task using the allocated one or more existing idle threads and the allocated configured one or more existing idle threads;

determining for a presence of a new task in the native task queue after execution of the task within the current task queue;

automatically deallocating the configured one or more existing idle threads from the current task queue when the new task in the native task queue is determined to be present;

automatically reconfiguring the one or more characteristics of the deallocated one or more existing idle threads based on the native task queue; and automatically reallocating the reconfigured one or more existing idle threads for the execution of the new task in the native task queue.

10. The device as set forth in claim 9 wherein the one or more processors is further configured to execute programmed instructions stored in the memory for the determining further comprises maintaining, the one or more existing idle threads in an idle state when the new task is not determined to be present in the native task queue.

11. The device as set forth in claim 9 wherein the one or more processors is further configured to execute programmed instructions stored in the memory for the determining further comprises:

creating one or more new threads to allocate for execution of the task when the existing one or more idle threads are determined to be unavailable in the one or more thread groups within the application ;

allocating the one or more of the new threads to the task when the existing one or more idle threads are determined to be unavailable; and executing the task using the allocated one or more of the new threads.

12. The device as set forth in claim 11 wherein the one or more processors is further configured to execute programmed instructions stored in the memory for the creating further comprises creating the one or more new threads wherein a number of the one or more new threads is less than a maximum threshold of new threads in the current task queue.

* * * * *